(12) United States Patent
Mugford

(10) Patent No.: US 7,069,878 B2
(45) Date of Patent: Jul. 4, 2006

(54) ANIMAL TRAINING DEVICE

(76) Inventor: Roger Arthur Mugford, 252 Almners Road. Lyne, Chertsey, Surrey (GB) KT16 0BL (*) Notice: Subject to any disclaimer, the term of this patent is extended or adjusted under 35 U.S.C. 154(b) by 0 days.

(21) Appl. No.: 10/414,501

(22) Filed: Apr. 16, 2003

(65) Prior Publication Data
US 2004/0118361 A1  Jun. 24, 2004

(30) Foreign Application Priority Data
Dec. 20, 2002  (GB) ............................ 0229821.4

(51) Int. Cl.
*A01K 37/00*  (2006.01)

(52) U.S. Cl. .................................................. 119/712
(58) Field of Classification Search ............... 119/712, 119/719, 905; 446/415; 178/115; 84/94.1, 84/402
See application file for complete search history.

(56) References Cited

U.S. PATENT DOCUMENTS

| | | | | |
|---|---|---|---|---|
| 949,551 A | * | 2/1910 | Schliecker | 446/415 |
| 1,206,933 A | * | 12/1916 | Simonds et al. | 446/415 |
| 3,172,393 A | * | 3/1965 | Breland | 119/719 |
| 3,538,637 A | * | 11/1970 | Smith | 446/415 |
| 3,735,046 A | * | 5/1973 | Romney | 178/115 |
| 3,902,272 A | * | 9/1975 | Molenaar | 446/415 |
| 5,351,653 A | * | 10/1994 | Marischen et al. | 119/719 |
| 5,712,452 A | | 1/1998 | Lin | 181/0.5 |
| 5,724,919 A | * | 3/1998 | Boyd et al. | 119/719 |
| 6,047,664 A | * | 4/2000 | Lyerly | 119/719 |

FOREIGN PATENT DOCUMENTS
DE  29718916  1/1998

* cited by examiner

Primary Examiner—Teri Pham Luu
Assistant Examiner—Elizabeth Shaw
(74) Attorney, Agent, or Firm—Jacobson Holman PLLC

(57) ABSTRACT

A hand held training device capable of producing discreet clicks when operated by a user, having a control by which the user can vary the volume and/or tone of the clicks produced.

16 Claims, 2 Drawing Sheets

ANIMAL TRAINING DEVICE

The invention relates to a training device for animals, such as dogs.

A known training device comprises a spring steel clicker tongue mounted in a generally rectangular casing having an opening enabling the trainer to engage the clicker tongue with his finger or thumb.

The training device operates by combining a click with a reward when an animal, in particular a dog, successfully completes a task. The click provides a clear signal to the animal that it has done something right and indicates that it is associated with a reward. It enables the trainer to reward correct behaviour, no matter how far away the trainee is from the animal and because it is a quick, distinctive sound, the animal learns that it has done something right.

According to the present invention there is provided an animal training device which produces discrete clicks when operated by a user, having a means by which the user can vary the volume and/or tone of the clicks produced. The known training device only produces clicks of one volume and/or tone. This can cause problems when training some animals, in particular some dogs, which are highly sound sensitive and can be frightened by loud or high pitched clicks. The ability to adjust volume and/or tone enables the trainer to use a single training device on a variety of animals of varying sensitivity.

Advantageously, the animal training device comprises an elongated casing with an opening to accommodate the user's finger or thumb, the casing containing a clicker strip fixed at one end within the casing, characterised in that the device includes means acting on the clicker strip for varying the volume and/or tone of the clicks produced by the clicker strip.

An embodiment of the invention will now be described by way of example with reference to the accompanying drawings, in which.

Figure 1:
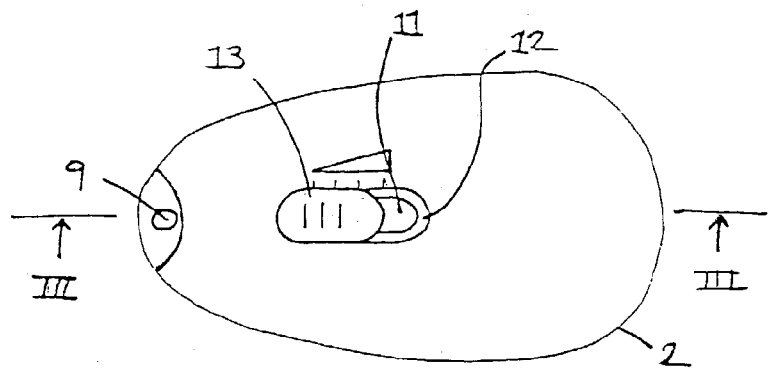
FIG. 1 is a top view of a training device.
Figure 2:
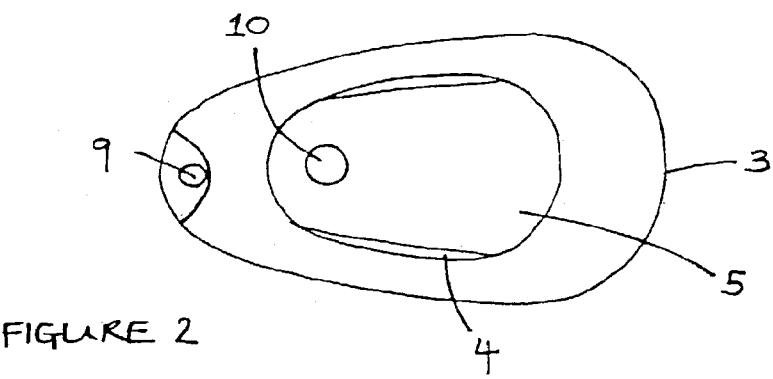
FIG. 2 is a bottom view of the training device shown in FIG. 1.
Figure 3:
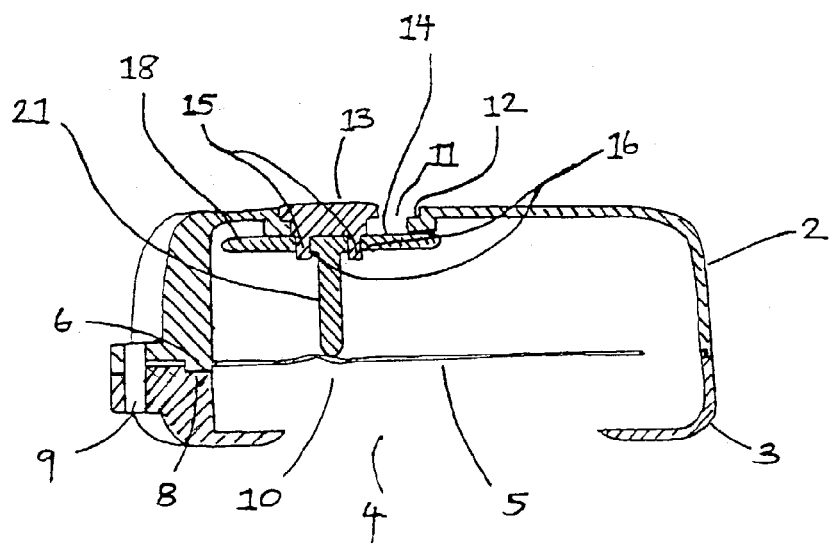
FIG. 3 is a longitudinal sectional view on line III—III of FIG. 1.
Figure 4:
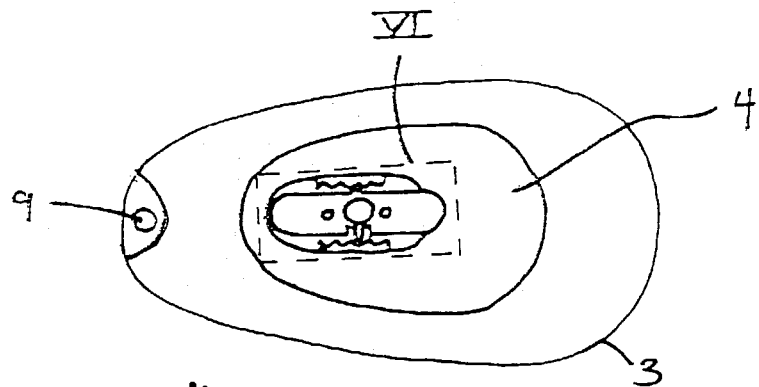
FIG. 4 is a bottom view of the training device shown in FIG. 1 with the clicker tongue removed.
Figure 5:
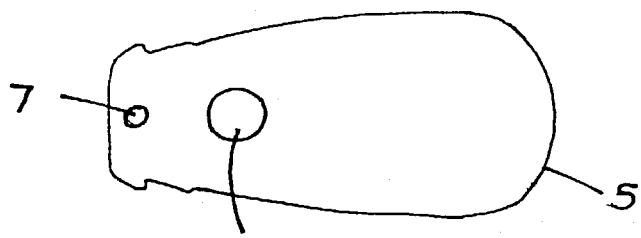
FIG. 5 is a plan view of the clicker tongue.

The training device 1 shown in the drawings comprises a casing assembled from an upper casing part 2 and a lower casing part 3. The lower casing part 3 has a large opening 4, capable of accommodating the finger or thumb of the user. A spring steel clicker tongue 5 is clamped between the upper and lower casing parts (2 & 3) and is further fixed in position by a pin 6 which passes through a hole 7 in the clicker tongue 5 and sits in cavity 8. The casing has a hole 9 at the clamping end of the casing to accommodate a wrist strap.

The spring steel clicker tongue 5, of the kind which toggles between a stable and an unstable position when deflected and released by the user's thumb, is formed with an indentation 10 which is concave relative to the lower casing part 2. The indentation 10 is positioned nearer to the clamped end of the clicker tongue 5, but equidistant from the two longer sides. The clamped section of the clicker tongue 5 is wider than the most narrow portion of the clicker tongue 5 which is free to move, thus resulting in the edges which are not clamped being clear of the inside face of the casing.

A round ended slot 11 in the upper casing part 2 has a stepped perimeter 12 which slidably supports a slider 13, the slider 13 being shorter than the slot 11. The slider 13 is secured to a control element 14 on the underside of the upper casing portion 2 by two pins 15 which extend from the slider 13 to engage in two apertures 16 in the upper portion 17 of the control element 14.

Figure 6:
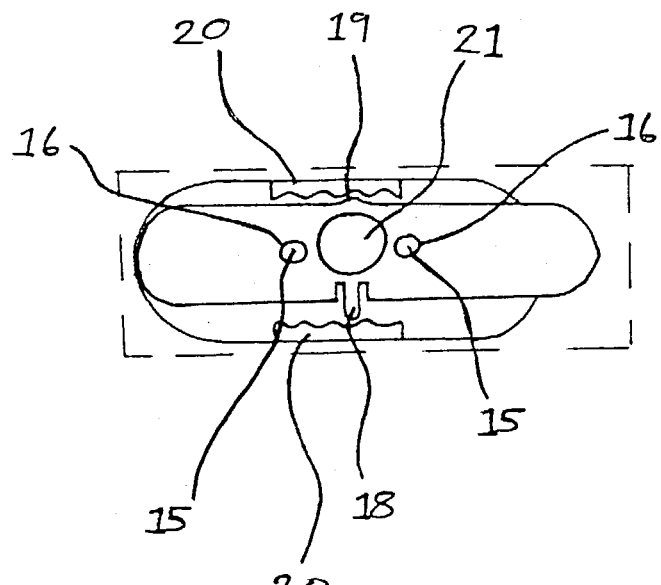
FIG. 6 is an enlarged view of the portion VI of FIG. 4.

As can be seen in FIG. 6, a resilient tongue 18 protrudes from one side of the control element 14 and a projection 19 protrudes from the opposite side. The tongue 18 and projection 19 engage with respective series of notches 20 along either side of the slot 11, on the underside of the upper casing portion 2, thereby defining a range of distinct positions for the slider 13.

A lower portion 21 of control element 14 extends into the body of the casing adjacent to the upper surface of the clicker tongue 5 where it acts as a fulcrum about which the clicker tongue 5 flexes, when operated. The position of the fulcrum can be varied, relative to the surface of the clicker tongue 5, by moving the slider 13.

The click training device is operated by applying an external force, by a finger or thumb, through the large opening 4 in the lower casing part 3, to the clicker tongue 5. Two clicks are produced, in the first instance when the clicker tongue 5 is deflected, by the external force, away from its stable position, and in the second instance when the clicker tongue 5 returns to its stable position. The volume and/or tone of the click produced is controlled by the position of the lower portion 21 of control element 14 relative to the clicker tongue 5 which can be altered by sliding the slider 13. When the control element 14 is moved further away from the clamped end 6 of the clicker tongue 5, the volume and/or tone of the click increases.

The invention claimed is:

1. An animal training device which produces discrete clicks when operated by a user, said animal training device comprising
    control means by which the user varies at least one of a volume and a tone of the clicks produced,
    an elongated casing with an opening to accommodate the user's finger or thumb, containing a clicker strip fixed at one end within the casings, and
    means acting on the clicker strip for varying the at least one of the volume and the tone of the clicks produced.

2. The animal training device according to claim 1, wherein the control means is slidably mounted within a slot in the casing.

3. The animal training device according to claim 2, wherein the slot is situated on the face of the casing opposite the opening.

4. The animal training device according to claim 1, wherein the control means extends into the casing adjacent to an upper surface of the clicker strip.

5. The animal training device according to claim 1, wherein the control means moves in a lengthwise direction along the elongated casing.

6. The animal training device according to claim 1, wherein movement of the control means is defined by a set of distinct positions.

7. The animal training device according to claim 6, wherein the movement of the control means is set by way of a resilient tongue engaging with a series of notches.

8. The animal training device according to claim 7, wherein the movement of the control means is further set by a ridged element, opposite the resilient tongue, which engages a second series of notches.

9. The animal training device according to claim 1, wherein the control means is assembled from a slider and a fulcrum element.

10. The animal training device according to claim 9, wherein the fulcrum element provides a means about which the clicker strip can flex when operated by a user.

11. An animal training device which produces discrete clicks when operated by a user, said animal training device comprising
  control means by which the user varies at least one of a volume and a tone of the clicks produced, the control means being slidably mounted within a slot in an elongated casing.

12. The animal training device according to claim 11, wherein the slot is situated on a face of the casing opposite an opening.

13. An animal training device which produces discrete clicks when operated by a user, said animal training device comprising
  control means by which the user varies at least one of a volume and a tone of the clicks produced, the control means moving in a lengthwise direction along an elongated casing.

14. An animal training device which produces discrete clicks when operated by a user, said animal training device comprising
  control means by which the user varies at least one of a volume and a tone of the clicks produced, movement of the control means being by way of a resilient tongue engaging with a series of notches.

15. The animal training device according to claim 11, wherein movement of the control means is further set by a ridged element, opposite the resilient tongue, which engages a second series of notches.

16. An animal training device which produces discrete clicks when operated by a user, said animal training device comprising
  control means by which the user varies at least one of a volume and a tone of the clicks produced, the control means being assembled from a slider and a fulcrum element.

\* \* \* \* \*